(12) United States Patent
Lindsey et al.

(10) Patent No.: US 7,936,081 B2
(45) Date of Patent: May 3, 2011

(54) POWER CONVERTER CONTROL SYSTEM FOR ELECTRIC POWERTRAINS

(75) Inventors: Robert Wayne Lindsey, Washington, IL (US); Jason Lee Miller, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 181 days.

(21) Appl. No.: 12/010,818

(22) Filed: Jan. 30, 2008

(65) Prior Publication Data

US 2009/0189446 A1    Jul. 30, 2009

(51) Int. Cl.
*B60L 1/00*   (2006.01)
*B60L 3/00*   (2006.01)
*H02G 3/00*   (2006.01)

(52) U.S. Cl. .......................... 307/9.1; 307/24
(58) Field of Classification Search ............. 307/24, 307/45, 86, 9.1
See application file for complete search history.

(56) References Cited

U.S. PATENT DOCUMENTS

| | | | |
|---|---|---|---|
| 4,594,571 A | 6/1986 | Neuhaus et al. | |
| 4,942,571 A | 7/1990 | Möller et al. | |
| 5,313,460 A | 5/1994 | Schmid | |
| 5,394,327 A | 2/1995 | Simon, Jr. et al. | |
| 5,656,921 A | 8/1997 | Farrall | |
| 6,283,892 B1 | 9/2001 | Steeby | |
| 6,420,797 B1 | 7/2002 | Steele et al. | |
| 6,511,399 B2 | 1/2003 | McCollum et al. | |
| 6,700,795 B1 | 3/2004 | Jones et al. | |
| 7,074,156 B2 | 7/2006 | Graf et al. | |
| 7,269,491 B2 | 9/2007 | Katrak et al. | |
| 7,282,875 B2 | 10/2007 | Lindsey | |
| 2005/0280422 A1* | 12/2005 | Kishibata et al. | 324/522 |
| 2007/0069678 A1 | 3/2007 | Lindsey | |

OTHER PUBLICATIONS

"TLK1501: 0.6 to 1.5 Gbps Transceiver," Jan. 2004, Texas Instruments Incorporated, Dallas, Texas.

* cited by examiner

*Primary Examiner* — Jared J Fureman
*Assistant Examiner* — Carlos Amaya
(74) *Attorney, Agent, or Firm* — Finnegan, Henderson, Farabow, Garrett & Dunner LLP

(57) ABSTRACT

A power converter control system for electric powertrains is disclosed. The power converter control system may include at least one power producing device and at least one power consuming device. The power converter control system may further include at least one power electronics module configured to convert and condition a flow of electrical current between the at least one power producing device and the at least one power consuming device. The at least one power electronics module may further be configured to serialize a flow of a first set of signals between the at least one power electronics module and at least one controller. The first set of signals may correspond to at least one characteristic of the at least one power electronics module.

20 Claims, 2 Drawing Sheets

POWER CONVERTER CONTROL SYSTEM FOR ELECTRIC POWERTRAINS

TECHNICAL FIELD

The present disclosure relates generally to a power converter control system, and more particularly, to a power converter control system for electric powertrains.

BACKGROUND

Present control systems for electric powertrains typically use multiple wires for controlling and communicating to each electronic switch within a power electronics module. The multiple wires, each of which may be critical, may be unreliable due to external noise, ground loops or other failures. Furthermore, the amount of wiring in conventional wiring systems for electric powertrains typically makes it difficult to remotely place electronic control modules that control the signals sent to the power electronic modules.

One method of increasing the reliability of communication signals in a powertrain, while allowing for remote placement of electronic control modules, is set forth in U.S. Pat. No. 7,269,491 (the '491 patent) issued to Katrak et al. The '491 patent discloses an engine management system including an engine control module and a transmission control module that are connected to a vehicle data bus. The '491 patent allows for the serialization of the vehicle data bus, which may reduce the amount of wiring in the engine management system. The '491 patent further discloses a second dedicated data bus, which may also be serialized, connecting the transmission control module to the engine control module, wherein the engine control module and the transmission control module perform processor validity and integrity checks over the dedicated data bus.

Because the engine management system of the '491 patent discloses an engine control module and a transmission control module that perform processor validity and integrity checks over the dedicated data bus, the reliability of communication signals in a powertrain may be improved. In addition, since the engine management system of the '491 patent may employ serialization for each data bus, the amount of wiring in a powertrain may be reduced, thereby allowing for remote placement of electronic control modules. Although the engine management system in the '491 patent may increase the reliability of communication signals in engine control and transmission control modules, the engine management system in the '491 patent may not allow for the increase in reliability for commutation and communication signals directed towards the electronic switches in a power electronics module. For example, the electronic assembly in the '491 patent may not provide a way to serialize/de-serialize the commutation and communication signals coupled to the electronic switches in a power electronics module.

The disclosed system is directed to overcoming one or more of the shortcomings set forth above.

SUMMARY

An aspect of the present disclosure is directed to a power converter control system. The power converter control system may include at least one power producing device and at least one power consuming device. The power converter control system may further include at least one power electronics module configured to convert and condition a flow of electrical current between the at least one power producing device and the at least one power consuming device. The at least one power electronics module may further be configured to serialize a flow of a first set of signals between the at least one power electronics module and at least one controller. The first set of signals may correspond to at least one characteristic of the at least one power electronics module.

Another aspect of the present disclosure is directed to a method for operating a power converter control system. The method may include generating at least one first set of signals indicative of a desired operation of a machine. The method may further include processing the first set of signals into commutation signals. The method may further include serializing the commutation signals and de-serializing the commutation signals. The method may further include converting, conditioning, and directing a flow of electrical current corresponding to the de-serialized commutation signals.

DETAILED DESCRIPTION

Figure 1:
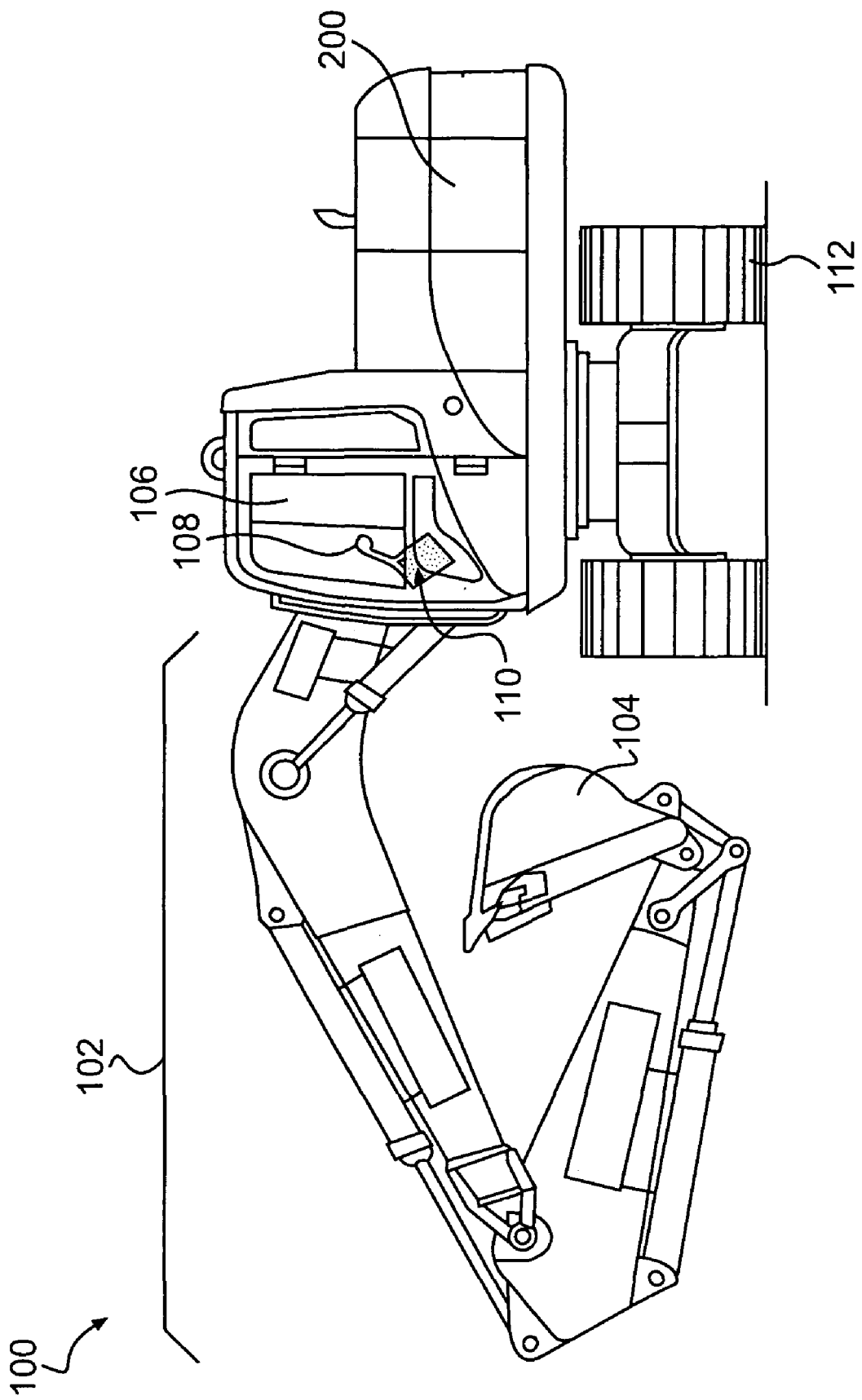
FIG. 1 is a diagrammatic illustration of an exemplary disclosed machine.

FIG. 1 illustrates an exemplary machine 100. Machine 100 may be a mobile machine that performs some type of operation associated with an industry such as mining, construction, farming, transportation, or any other industry known in the art. For example, machine 100 may be an earth moving machine such as an excavator, a dozer, a loader, a backhoe, a motor grader, or any other earth moving machine. It is contemplated that machine 100 may be different than that of FIG. 1. For example, machine 100 may be a vehicle such as for example, an off highway truck, a rail transport vehicle, a mobile rail car mover, and the like.

Machine 100 may include a linkage system 102, a tool 104 attachable to linkage system 102, and an operator interface 106 used to control motion of linkage system 102. Operator interface 106 may be configured to receive input from a machine operator indicative of a desired movement of machine 100. Specifically, operator interface 106 may include an operator interface device 108 and an electronic control module 110. In one embodiment, operator interface device 108 may be a multi-axis joystick located to one side of an operator station. Operator interface device 108 may be a proportional-type controller configured to position and/or manipulate linkage system 102 and/or tool 104 by producing and directing an interface device position signal to electronic control module 110. The interface device position signal may be indicative of a desired movement of tool 104. It is contemplated that additional and/or different operator interface devices may be included within operator interface 106 such as, for example, wheels, knobs, push-pull devices, switches, pedals, and other operator interface devices known in the art.

Electronic control module 110 may include one or more components configured to perform system controls such as, for example, a memory, a secondary storage device, and a processor such as, for example, a central processing unit. One skilled in the art will appreciate that electronic control module 110 may contain additional and/or different components. Various other circuits such as, for example, power supply circuitry, signal conditioning circuitry, solenoid driver circuitry, and/or any other circuit that is known in the art may be associated with electronic control module 110. Machine 100 may further include a traction device 112 located on each side of machine 100. Traction device 112 may include tracks, wheels, belts, or other traction devices. Traction device 112 may or may not be steerable. Machine 100 may further include a power converter control system 200 configured to serialize and/or de-serialize signals that process the sequencing of switches in a power electronics module (i.e., switch commutation signals or commutation signals).

Figure 2:
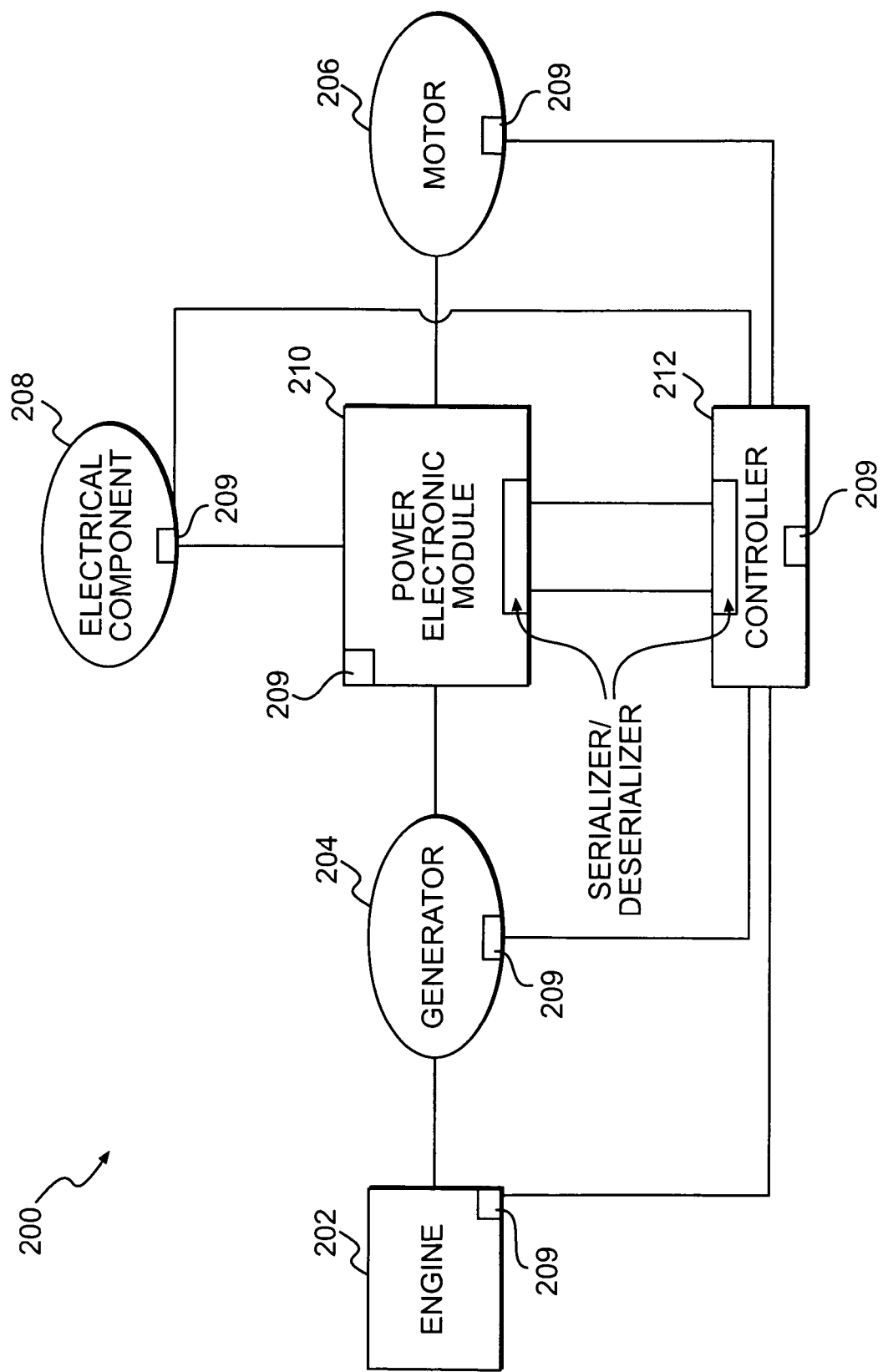
FIG. 2 is a diagrammatic illustration of an exemplary disclosed power converter control system for an electrical powertrain for the machine of FIG. 1.

FIG. 2 illustrates an exemplary power converter control system 200 consistent with the present disclosure. System 200 may include an engine 202, a generator 204, a motor 206, and electrical components 208 electrically coupled via a power electronics (PE) module 210. System 200 may be configured to serialize and/or de-serialize commutation and/or communication signals for a PE module 210. In one example, system 200 may be configured to serialize/de-serialize commutation signals indicative of the operation of a generator 204 and/or a motor 206. In another example, system 200 may be configured to serialize/de-serialize communication signals indicative of a voltage, current, temperature, pressure, and/or other parameters within system 200 and machine 100. It is contemplated that the serialized and/or de-serialized signals may be electrical signals transmitted via electrical wire, light signals transmitted via fiber optic cable, and/or other signals known in the art.

System 200 may further include a plurality of sensors 209 configured to collect and transmit voltage, current, temperature, and pressure characteristics, as well as positions of electronic switches, and/or other parameters corresponding to machine 100 and system 200.

Engine 202 may include at least one power-producing device that is configured to output mechanical energy. In one example, engine 202 may be an internal combustion engine having multiple subsystems that cooperate to produce a mechanical power output. One skilled in the art will recognize that engine 202 may be any type of internal combustion engine such as, for example, a gasoline or diesel-powered engine. The subsystems included within engine 202 may include, for example, a fuel system, an air induction system, an exhaust system, a lubrication system, a cooling system, and/or any other appropriate system(s).

Generator 204 may be a power producing/consuming device configured to mechanically receive power from engine 202, and convert at least a portion of that power into electricity. For example, generator 204 may be an alternating current synchronous generator, an induction generator, a permanent-magnet generator, a switched-reluctance generator, or any other generator known in the art capable of converting mechanical power into electrical power. In one example, generator 204 may be a starter/generator that is used in a motor-mode to start the engine 202 then provide electrical power for the electric powertrain after engine 202 is started. In another example, generator 204 may be configured to receive electrical power and convert at least a portion of the electrical power to mechanical power. It is contemplated that engine 202 and generator 204 may be replaced by a single device or multiple devices that can perform the tasks of both engine 202 and generator 204.

Motor 206 may include multiple components that interact to produce mechanical power in response to electrical power consumption. Motor 206 may be coupled to an output shaft (not shown), and, as electrical power is supplied from generator 204 to motor 206 via PE module 210, motor 206 may generate a torque applied through the output shaft at a range of rotational speeds. The output shaft may be connected to traction device 112 of machine 100, to thereby propel machine 100 in response to the applied torque.

Electrical component 208 may include one or more power producing/consuming device(s) that may use electrical current for an operation such as, for example, lights, heating and/or cooling devices, air compressors, pumps, actuators for moving various components of machine 100, and/or various other types of electric components. As an example, electrical component 208 may be electric motors that assist in moving linkage system 102. The electric motors may assist in moving linkage system 102 by being configured to force fluid to hydraulic actuators that are used to move linkage system 102. As another example, electrical component 208 may be spotlights (not shown) that are used on machine 100. As yet another example, electrical component 208 may be one or more fans that are configured to cool engine 202, and/or generator 204.

PE module 210 may be an electronic device configured to convert and condition a flow of an electrical current between generator 204, motor 206, and electrical components 208. For example, PE module 210 may convert a flow of an electrical current from generator 204 to motor 206 and/or electrical components 208 by being configured to receive an input of fixed or variable frequency alternating current (AC) from generator 204 and output a fixed or variable frequency AC and/or direct current (DC) from the AC input. PE module 210 may direct the fixed or variable frequency AC and/or DC to motor 206 and/or electrical components 208. As another example, PE module 210 may power condition the flow of an electrical current from generator 204 by ensuring the electrical current is balanced, three phase, and periodic. PE module 210 may perform power conditioning, electrical current rectification, and/or electrical current inversion through power semiconductor switching devices such as, for example, diodes, thyristors, transistors (e.g., insulated-gate bipolar transistors, metal-oxide-semiconductor field-effect transistor, etc.), and/or other appropriate semiconductor devices. In addition, PE module 210 may perform motor or generator winding commutation functions through power semiconductor switching devices to control the flow of electrical to mechanical energy.

PE module 210 may additionally and/or alternatively contain electronic circuitry that is configured to serialize/de-serialize commutation and communication signals within system 200. The electronic circuitry may be further configured to direct the serialized/de-serialized signals to appropriate locations in system 200. As an example, PE module 210 may be configured to de-serialize commutation signals from a controller 212, wherein the commutation signals correspond to the operation of electronic switches within PE module 210. In another example, PE module 210 may be configured to serialize communication signals collected by one or more sensors 209 that are indicative of a voltage, current, temperature, pressure, and/or other parameters corresponding to PE module 210, and then direct the serialized signals to controller 212. Furthermore, it is contemplated that system 200 may have a plurality of PE modules 210 circuitry coupled to at least one of electrical components 208 and/or at least one of motor(s) 206. That is, it is contemplated that motor(s) 206 and/or electrical components 208 may have their own PE module 210. It is further contemplated that the PE module(s) 210 may be located in close proximity to, or within, motor housing(s) in order to keep the commutation path substantially short.

Controller 212 may be configured to process control signals that correspond to the operation of generator 204 and/or motor 206 and subsequently direct serialized commutation signals to PE module 210. For example, an operator may move operator interface device 108 to affect a desired movement of linkage system 102. In response, electronic control module 110 may direct a control signal indicative of the desired movement of linkage system 102 to controller 212. The control signal may include information such as, for example, velocity, direction, torque, position and/or other attributes indicative of the desired movement of linkage system 102. Controller 212 may be configured to process the control signal into a switch commutation pattern in order to control power semiconductors located within PE module 210, and then further serialize the switch commutation pattern. It is contemplated that the processing of the control signal into a switch commutation pattern may be based on space vector modulation, sine triangle modulation, or any suitable modulation method.

PE module 210 may be configured to de-serialize the switch commutation pattern so that the commutation signal may be used to affect the opening or closing of the appropriate electronic switches located within PE module 210, allowing electrical power to flow between generator 204 and motor 206, thereby affecting the desired movement of linkage system 102.

In addition, controller 212 may be configured to process control signals, indicative of an amount of voltage or current desired from generator 204, into serialized switch commutation patterns for PE module 210. For example, due to some operation of machine 100, electronic control module 110 may request, through control signals, generator 204 to produce a DC bus voltage of 500 volts within PE module 210. In response, controller 212 may process the control signals into switch commutation patterns based on space vector modulation, sine triangle modulation, or any suitable modulation method. Controller 212 may further serialize and condition the pattern for high-speed communication to PE module 210. PE module 210 may de-serialize the serialized switch commutation patterns so that the information contained within the switch commutation patterns may be used to affect desired semiconductor switch locations and DC bus voltages.

Controller 212 and PE module 210 may serialize and de-serialize signals at a rate that is appropriate for switch commutation patterns to be updated at the desired modulation frequency. For example it may be desired to provide a new switch commutation pattern to PE module 210 at a rate of 20 k Hz (i.e., 20,000 patterns per second). A switch commutation pattern may be comprised of 10 bits of information, therefore a serialization and de-serialization bit rate of 10 times the pattern rate may be required. For example, an update rate of rate of 20 k Hz may require a bit rate of 200 k Hz.

Additionally, controller 212 and PE module 210 may serialize and de-serialize information in a multiplexed configuration where multiple switch commutation patterns are serialized and de-serialized at a desired switch commutation pattern rate. For example, it may be desired to refresh the commutation switch patterns for generator 204 and/or motor 206 at a 20 k Hz rate, therefore 20 bits of information may be required at a 20 k Hz rate. Those familiar with the art will appreciate that controller 212 and PE module 210 may serialize and de-serialize at any rate suitable for the communication media and the desired number of switch commutation patterns at a desired modulation frequency or time interval. It is contemplated that serialization and de-serialization methods may require processing time overhead and bit rates may be different than described above to meet the desired pattern rate.

Controller 212 may include one or more components configured to perform its operation such as, for example, a memory, a secondary storage device, a logic array, and a processor such as, for example, a central processing unit. One skilled in the art will appreciate that controller 212 may contain additional or different components. Various other circuits such as, for example, power supply circuitry, signal conditioning circuitry, solenoid driver circuitry, and/or any other circuit that is known in the art may be associated with controller 212. Furthermore, it is contemplated that a plurality of controllers 212 may be used in conjunction with a plurality of PE modules 210, if desired.

It is further contemplated that multiple communication and/or control signals indicative of a desired operation of machine 100 may be sent to controller 212. As such, controller 212 may process the multiple communication and/or control signals into commutation signals, and serialize the commutation signals. Controller 212 may further direct the multiple commutation signals to PE module 210. PE module 210 may be configured to de-serialize the multiple commutation signals and direct the multiple commutation signals to the appropriate electronic switches located within PE module 210, thereby affecting the desired operations of machine 100. PE module 210 may further be configured to receive sensor and fault feedback signals (communication signals) from sensors 209 that are indicative of the position of the electronic switches and/or other characteristics associated with PE module 210 such as for example, voltage, current, temperature, pressure, and/or other characteristics. PE module 210 may further be configured to serialize the sensor and fault feedback signals and direct the serialized sensor and fault feedback signals to controller 212. Controller 212 may be configured to de-serialize the sensor and fault feedback signals and direct the de-serialized sensor and fault feedback signals to appropriate electrical equipment located on machine 100 such as, for example, lights, buzzers, pressure gauges, controllers, and/or other notification devices that operate as a function of the de-serialized signals such as, for example, the voltage, current, temperature, pressure, and/or other parameters within system 200. It is contemplated that controller 212 and electronic control module 110 may be replaced by a single device or multiple devices that can perform the tasks of both controller 212 and electronic control module 110.

INDUSTRIAL APPLICABILITY

The disclosed system may be applicable to any machine where it is desirable to minimize the amount of electrical wiring associated with a power electronics module in electric powertrains, as well as allow for remote placement of controllers configured to control the signals sent to power electronic modules in electric powertrains. The disclosed system may minimize the amount of electrical wiring to power electronic modules and allow for remote placement of controllers that control the signals sent to power electronic modules in electric powertrains by being configured to serialize and de-serialize the commutation and/or communication signals in an electric powertrain. The operation of power converter control system 200 will now be explained.

An operator may move operator interface device 108 corresponding to a desired movement of machine 100. In response to the movement of operator interface device 108, electronic control module 110 may direct control signals indicative of the movement of operator interface device 108 to controller 212. The control signals may correspond to information that identifies electronic switches within PE module 210 to be engaged or disengaged in order to substantially allow or substantially stop a flow of power between generator 204 to motor 206 and/or electrical components 208.

Controller 212 may be configured to process the control signals into switch commutation patterns, and direct the switch commutation patterns to PE module 210. PE module 210 may be configured to de-serialize the commutation patterns and direct the de-serialized patterns to the appropriate electronic switches located within PE module 210, allowing electrical power to flow between generator 204 to motor 206 and/or electrical component 208, thereby affecting the desired movement of machine 100.

PE module 210 may be configured to receive sensor and fault feedback signals from sensors 209 that are indicative of the position of the electronic switches and/or other voltage and current information signals. PE module 210 may further be configured to serialize the sensor and fault feedback signals produced by sensors 209, and direct the serialized sensor and fault feedback signals to controller 212. Controller 212 may be configured to de-serialize the sensor and fault feedback signals to determine and affect the power flow between generator 204, motor 206, and/or electrical components 208. Additionally, controller 212 may direct the de-serialized sensor and fault feedback signals to appropriate electrical equipment located on machine 100 such as, for example, lights, buzzers, pressure gauges, controllers, and/or other notification devices.

It will be apparent to those skilled in the art that various modifications and variations can be made to the disclosed power converter control system. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. A power converter control system, comprising:
   at least one power producing device;
   at least one power consuming device; and
   at least one power electronics module configured to:
      convert and condition a flow of electrical current between the at least one power producing device and the at least one power consuming device; and
      serialize a flow of a first set of signals between the at least one power electronics module and at least one controller,
   wherein at least one of the first set of signals corresponds to at least one characteristic of the at least one power electronics module; and
   wherein the at least one controller is configured to:
      process a second set of signals into commutation signals for controlling at least one switch in the at least one power electronics module;
      serialize the commutation signals; and
      direct the serialized commutation signals to the at least one power electronics module.

2. The system of claim 1, wherein the at least one controller is configured to de-serialize the first set of signals.

3. The system of claim 1, further including at least one electronic control module configured to generate the second set of signals indicative of an operation of the at least one power producing device and the at least one power consuming device.

4. The system of claim 1, wherein the at least one power electronics module is further configured to de-serialize the serialized commutation signals.

5. The system of claim 4, wherein the at least one power electronics module is further configured to convert and condition the flow of electrical current between the at least one power producing device and the at least one power consuming device corresponding to the de-serialized commutation signals.

6. The system of claim 5, wherein the at least one power electronics module is located within a housing of the at least one power producing device.

7. A method for operating a power converter control system, comprising:
   generating a first set of signals indicative of a desired operation of a machine;
   processing the first set of signals into commutation signals;
   serializing the commutation signals;
   de-serializing the commutation signals; and
   converting, conditioning, and directing a flow of electrical current corresponding to the de-serialized commutation signals.

8. The method of claim 7, further including generating a second set of signals corresponding to characteristics of a power electronics module.

9. The method of claim 8, further including serializing the second set of signals, wherein the serializing is completed within the power electronics module.

10. The method of claim 9, further including de-serializing the serialized second set of signals, wherein the de-serializing is completed remote from the power electronics module.

11. The method of claim 10, further including alerting an operator to the characteristics of the power electronics module via the de-serialized second set of signals.

12. The method of claim 7, further including controlling at least one switch in a power electronics module responsive to the de-serialized commutation signals.

13. An electric powertrain, comprising:
   at least one engine;
   at least one generator;
   at least one motor; and
   at least one controller configured to:
      receive control signals indicative of a desired operation of the electric powertrain;
      process the control signals into commutation signals for controlling at least one switch in at least one power electronics module;
      serialize the commutation signals; and
      direct the serialized commutation signals to the at least one power electronics module.

14. The electric powertrain of claim 13 wherein the at least one power electronics module is configured to de-serialize the commutation signals.

15. The electric powertrain of claim 14 wherein the at least one power electronics module is further configured to convert, condition, and direct a flow of electrical current corresponding to the de-serialized commutation signals.

16. The electric powertrain of claim 15 wherein the at least one power electronics module is further configured to receive at least one second signal from at least one sensor, wherein the at least one second signal corresponds to at least one characteristic of the at least one power electronics module.

17. The electric powertrain of claim 16 wherein the at least one power electronics module is further configured to serialize the at least one second signal and direct the at least one second signal to the at least one controller.

18. The electric powertrain of claim 17, wherein the at least one power electronics module is located within a housing of the at least one generator.

19. The electric powertrain of claim 14, wherein the at least one power electronics module is configured to control the at least one switch in at least one power electronics module, and at least one of the generator or the motor responsive to the de-serialized commutation signals.

20. The electric powertrain of claim 17, wherein the at least one power electronics module is located within a housing of the at least one motor.

* * * * *